US United States Patent Office 3,456,469
Patented July 22, 1969

3,456,469
HOT EXTRUSION OF METALS
Robert R. Clappier, Bronxville, and Ewan C. MacQueen,
Piermont, N.Y., assignors to The International Nickel
Company, Inc., New York, N.Y., a corporation of
Delaware
No Drawing. Filed Feb. 24, 1967, Ser. No. 618,334
Int. Cl. B21b 45/02; C10m 7/02
U.S. Cl. 72—42                                      3 Claims

ABSTRACT OF THE DISCLOSURE

Directed to the hot extrusion of metals such as steels, nickel and nickel-base alloys wherein mineral wool is employed as the extrusion lubricant.

---

The present invention is directed to an inexpensive fibrous lubricant for use in the hot extrusion of metals.

Extrusion is an operation now used extensively for the production of mill products, including tubing and solid products such as bars and other solid extrusions having particular cross-sectional profiles. In the extrusion of ferrous metals such as steel, stainless steel, etc., and of nickel-base alloys, it is necessary to heat the extrusion billet to temperature of the order of about 2000° F. to about 2350° F. in order that the metal will be sufficiently plastic to permit of its extrusion through the die orifice. Generally, extrusion equipment itself comprises a heavy cast steel cylindrical container, which is open at one end and which is provided at the other end with a die through which the heated billet is to be forced. A ram which may be powered hydraulically or otherwise is brought to bear against the rearward end of the extrusion billet after insertion thereof into the container and pressure is applied to the heated billet sufficient to force the hot metal through the die in the opposite end of the container. When solid forms such as bar are produced a solid billet is employed. When tubing is to be produced a hollow billet may be employed and auxiliary tooling is provided including a mandrel forming part of the ram apparatus, which after insertion into the billet hollow, provides a working surface against which the inner wall of the tube is formed. In producing tubing, the hollow billet is placed in the container, the mandrel is passed through the interior passage in the hollow billet such that the forward end of the mandrel rests within the die orifice. The tube is then extruded by the application of pressure from the ram against the rearward end of the extrusion billet. The pressures required for movement of the billet metal during the extrusion operation, particularly when iron-base alloys and nickel-base alloys are being extruded, are high. Unless a satisfactory lubricant is interposed between the hot billet and the several tool surfaces, many undesired effects result, including excessively high extrusion pressures, scoring of the container lining, excessive die wear, and the production of extruded articles having poor surface. It was discovered as early as 1941 that glass could be used as the lubricant for the extrusion of steels and nickel-base alloys which require that the extrusion billet be heated to temperatures on the order of about 2000° F. to 2350° F. for extrusion. While various forms of glass, even including glass plate, have been recommended in the art, one of the forms which has been found to be satisfactory consists of fibrous glass batts or pads inserted between the extrusion billet and the die. Fibrous glass veils, i.e., a thin sheet of intermingled glass fibers, are also used between the hot billet and the container walls. Another form of glass which is currently employed in the trade for lubrication of the die involves a disc made from glass powder which may, for example, be ground window glass bonded together with a binder such as sodium silicate. These discs are fragile, have poor shelf life, and tend to fall over when inserted into the container. Experience has indicated that, with certain alloys, use of the bonded glass powder disc frequently yields an extruded product having a surface which is undesirably roughened. In addition, the disc occasionally is subject to breakage while it is in the container. When this undesired event occurs, die damage and the production of deep longitudinal scores in the extruded product can result with consequent economic loss. The bonded glass powder disc is economically attractive since it can be produced from ground waste glass. However, the production of roughened surfaces in extruded products is undesirable and requires additional overhauling of the extruded form before it can be subjected to further mill processing, particularly in the case of nickel and nickel-base alloys, including nickel-chromium alloys, nickel-chromium-iron alloys, etc. The fiber glass batts which may be employed between the end of the extrusion billet and the die generally provide better surfaces on extruded products but are, relatively speaking, quite expensive. Thus, the glass fiber which is formed into the batt is usually produced by forcing molten glass through a fine orifice and thereafter elongating the material by methods well known in the art to fiber of the desired dimension. This operation is quite expensive and the expense of the operation is reflected in the price of the fiber glass material. The fiber glass material provides a satisfactory surface relatively free from the roughened surface found on extruded products made of nickel and nickel-base alloys when the bonded glass powder disc is used. The fiber glass batts placed between the end of the billet and the die will generally be made in the form of rings when tubing is to be extruded to facilitate passage of the mandrel through the billet and the lubricant batt prior to the beginning of the actual extrusion operation. When solid shapes are to be extruded the batt may be in the form of a disc without a central opening. It would be desirable, however, to provide an extrusion lubricant having the desirable lubricating properties of fiber glass at a substantial reduction in price.

An extrusion lubricant having the desirable lubricating properties of fiber glass but which can be made available at a substantial reduction in cost as compared thereto has now been discovered.

It is an object of the present invention to provide a satisfactory extrusion lubricant of fibrous nature at a very substantial cost saving, on a lubricant cost basis, as compared to fibrous lubricants employed heretofore.

It is a further object of the present invention to utilize as an extrusion lubricant a readily available, inorganic fibrous material.

It is another object of the inventoin to provide an extrusion lubricant which is inexpensive but yet provides excellent surfaces upon extruded articles.

Other objects and advantages will become apparent from the following description.

Broadly stated, the present invention is directed to the use of mineral wool as an extrusion lubricant between hot extrusion billets and the extrusion tooling including the container wall, the die, etc. The material is particularly applicable as an extrusion lubricant in the extrusion of billets which are heated in the temperature range of about 2000° F. to about 2350° F. prior to extrusion.

Advantageously, the mineral wool lubricant is impregnated or coated with up to about 60%, e.g., about 5% to about 50%, by weight of an auxiliary material from the group consisting of alkali metal and alkaline earth metal halides, alkali metal and alkaline earth metal carbonates and particulate glass.

The expression "mineral wool" as employed herein refers to a material commonly employed in heat insulating, air filtering, etc. It is produced from molten siliceous materials obtained from materials such as naturally occurring rocks ("wool-rocks"), slag materials such as metallurgical slags, etc., and is provided in fibrous form generally by blowing hot gas such as air or steam across a thin stream of the molten material. The mineral wool is compositionally adjusted such that the acid constituents, principally silica, and the basic constituents, e.g., lime (CaO) and magnesia (MgO), are present in approximately equal amounts on a molar basis. The material may contain up to about 15% alumina, e.g. about 8% to about 14%, up to about 2% titania, up to about 2% of alkali metal oxides, up to about 5% or about 10% iron oxide, e.g., up to about 1.5%, with the remainder being silica, lime and magnesia, with the silica content usually being about 35% to about 45%, e.g., about 39% to about 43%, the lime content usually being about 30% to about 40%, e.g., about 34% to about 38%, and the magnesia usually being about 5% to about 10%. The sulfur content of the material should be low, e.g., not more than about 0.8% and preferably not more than about 0.5%, and the contents of lead and tin should be as low as possible, especially when nickel and high-nickel alloys are to be extruded. The mineral wool material is fibrous with the average fiber diameter usually being about 1 to about 20 microns in diameter with the average fiber diameter more usually being about 5 to about 10 microns. The material will generally have a density of about 2 to about 12 pounds per cubic foot when provided in the form of board. Since mineral wool generally has a "flow point" on heating on the order of about 2400° F., it may be desirable to mix or coat the material with a fluxing ingredient from the group consisting of alkali and alkaline earth metal halides, alkali and alkaline earth metal carbonates. These materials cannot be used by themselves as extrusion lubricants. A thin coating of glass fiber or of particulate glass having a particle size such that 75% will pass a 60 mesh sieve can also be employed upon the mineral wool batt. Barium chloride is an example of a satisfactory fluxing material, although other salts such as lithium chloride, lithium carbonate, cryolite, and sodium carbonate may be employed along with or in place of barium chloride. The mineral wool batts cut to the size desired for use in extruding a particular billet size in a particular container can be impregnated or coated with the fluxing material as a solution or slurry in, for example, water, with the resulting batt being dried before use. Alternatively, solid particles, e.g., fine glass, can be applied to the batt surface by means of a binder such as sodium silicate, an adhesive, etc.

The material is particularly useful in the extrusion of metals and alloys having a melting point (i.e., beginning of melting) of at least about 2300° F. or 2350° F. containing up to about 30% chromium, up to about 35% copper, up to about 30% cobalt, up to about 5% aluminum, up to about 5% titanium, up to about 5% columbium, up to about 10% molybdenum, up to about 10% tungsten and the balance essentially metal from the group consisting of nickel and iron. Examples of metals and alloys which may be extruded in accordance with the invention are set forth in the following table:

TABLE

| Alloy No. | Percent | | | | | | | | | |
|---|---|---|---|---|---|---|---|---|---|---|
| | C | Ni | Mn | Fe | Si | Cu | Cr | Al | Ti | Cb | Mo |
| 1 | 0.06 | 99.5 | 0.25 | 0.15 | 0.05 | | | | | | |
| 2 | 0.12 | 66 | 0.9 | 1.35 | 0.15 | 31.5 | | | | | |
| 3 | 0.15 | 65 | 0.6 | 1 | 0.15 | 29.5 | | | 2.8 | 0.5 | |
| 4 | 0.04 | 76 | 0.2 | 7.2 | 0.2 | 0.1 | 15.8 | | | | |
| 5 | 0.04 | 71 | 2.25 | 7.2 | 0.12 | 0.1 | 16 | | | 3 | |
| 6 | 0.04 | 74 | 0.2 | 7.2 | 0.2 | 0.1 | 15.8 | | | 2 | |
| 7 | 0.04 | 32 | 0.75 | 46 | 0.35 | 0.3 | 20.5 | 0.3 | 0.3 | | |
| 8 | 0.05 | 61 | 0.15 | 3 | 0.3 | | 22 | | | 4 | 9 |

Common steel grades and stainless steels, e.g. 18–8 stainless steel, can also be satisfactorily extruded with the new lubricant.

It was found that the "flow point" of one type mineral wool as supplied was about 2400° F. In ascertaining this figure, a sample of the material was first melted, crushed to powder and a portion of the crushed powder was then melted in air in a nickel boat. The temperature was raised gradually while maintaining visual observation of the powder with the flow point being taken as the temperature at which the material from the pile of powder melted and flowed away from the pile. It was found that introduction of about 45% by weight of barium chloride reduced the flow point of the mineral wool from 2400° F. to 2200° F. This effect of barium chloride and like materials appears beneficial in the extrusion of certain alloys at a high extrusion ratio, e.g., ratios of 20:1 or higher. Other mineral wools having lower flow points may also be used with or without additions.

In order to give those skilled in the art a better understanding and/or appreciation of the advantages of the invention, the following illustrative examples will now be given:

EXAMPLE I

Extrusion lubricant batts in the form of a ring having an outer diameter of about 11 1/16 inches and an inner diameter of about 4 inches were cut from 4-inch-thick mineral wool board containing about 39% silica, about 12% alumina, about 1% ferric oxide, about 40% lime, and about 8% magnesia and having a density of about 4 pounds per cubic foot. The ring batts were employed at the leading end of a hollow billet made of an alloy containing about 16% chromium, about 7% iron, and the balance essentially nickel, weighing about 705 pounds and having an outside diameter of about 10.7 inches. The extrusion billets were heated to about 2300° F. and were extruded using the mineral wool batts, a thin glass veil about the exterior of the billet and powdered glass in the bore of the billet to lubricate the interior. Two successful extrusions to 3.25-inch diameter by ½-inch wall tubing were produced but on the third successive attempt the press stalled. It was found, however, that when a thin piece of fiber glass amounting to about 10% by weight of the batt was placed on the surface of the batt next to the die that good performance was again obtained.

EXAMPLE II

Thirty-two ring shaped batts cut from a 4 inch mineral wool board having a density of about 4 pounds per cubic foot were dipped in a slurry of barium chloride and water to coat the cylindrical surfaces and ends of the batts, and the coated batts were then dried by heating for 4 hours at 600° F. During the drying operation, the barium chloride coating on the supported end of each batt became detached. The resulting batts had a coating amounting to about 45% by weight of barium chloride on the basis of the total weight of each batt. The batts were employed as extrusion lubricant, with the coated end of the batt toward the die, between the die and the ends of billets made of an alloy containing about 20% chromium, about 46% iron and the balance essentially nickel, weighing about 360 pounds, having an inside diameter of about 2⅛ inches and having an outside diameter of about 8.75 inches. Regular glass lubrication was employed between the cylindrical walls of the container and the billet and to lubricate the interior of the hollow billet. The resulting 2.5-inch diameter by 5/16-inch wall tube extrusions had an excellent surface and no difficulties were encountered.

EXAMPLE III

Eighty-three ring shaped batts having an outside diameter of 9⅛ inches and an inside diameter of 4 inches were cut from 4 inch thick mineral wool board. The batts weighed about ⅓-pound each. The batts were coated with barium chloride and dried as described in Example II. The batts were employed as in Example II in the extrusion of hollow billets having an outside diameter of about 8¾ inches, and inside diameter of about 2⅛ inches and a length of about 23½ inches made of an alloy containing about 16% chromium, about 7% iron and the balance essentially nickel. The billets were heated to about 2300° F. prior to extrusion. A glass mat lubricant was employed between the outside of the billet and the container and glass powder lubricant was employed in the interior of the billets. Eighty-three billets were successfully extruded to tube having an outside diameter of about 2½ inches, and a 5/16-inch wall using the aforedescribed practice. In terms of die life, time of extrusion, starting pressure and surface condition of the resulting tube, no differences were noted as compared to prior practice employing fiber glass ring extrusion lubricant between the end of the billet and the die. Cost analysis demonstrated, however, that the barium chloride coated mineral wool extrusion lubricant was only about one-tenth to about one-fifth as expensive as the fiber glass batt lubricant.

EXAMPLE IV

Sheets ¼-inch thick by 30 inches wide by 30 inches long of mineral wool board having a density of about 4 pounds per cubic foot were employed as the lubricant between the surface of round hollow billets made of an alloy containing about 16% chromium, about 7% iron, with the balance essentially nickel, having an outside diameter of about 10.7 inches, an inside diameter of about 2½ inches and about 26½ inches long heated to a temperature of about 2300° F. by placing the sheets on a tilting billet table, sprinkling the sheet surface with barium chloride powder and rolling the hot billet thereover. The sheets adhered to the hot billet surface. The billets were successfully extruded to tubing having an outside diameter of 3¼ inches and a ½-inch wall using barium chloride coated mineral wool ring batts between the billet end and the die with no difference being noted in extruded tube quality as compared to the prior practice wherein a more expensive fiber glass veil was employed as lubricant between the billet surface and the wall of the container. Nine tubes in succession were produced.

It is not fully understood why a coating of a fluxing agent, e.g., barium chloride, or glass powder or glass fiber on the mineral wool lubricant appears to be of assistance. However, in the case wherein nickel-base alloys are being extruded at high extrusion ratios, e.g., 20:1 and higher, there is a considerable initial resistance which must be overcome before movement of the billet metal can be initiated. Thus, the highest pressure encountered during the extrusion stroke occurs before any substantial movement of billet metal begins. Under these conditions, it appears that the additives contribute toward the initiation of billet metal movement. Once such movement is begun, it appears to continue with the production of extruded products having good surface. When only a single flat face of the mineral wool batt is coated, observation has confirmed that good results are obtained both when the coating faces the die and when it faces the billet. Mineral wool is a material of relatively low density. Hence, batts for die lubrication of necessity have a substantial thickness in order to provide a supply of lubricant for the entire length of the extruded section being produced. This thickness contributes to the vertical stability of the batt and eliminates any tendency for it to fall over in the container. The material thus retains its proper position against the die surface.

Although the present invention has been described in conjunction with preferred embodiments it is to be understood that modifications and variations may be resorted to without departing from the spirit and scope of the invention, as those skilled in the art will readily understand. Such modifications and variations are considered to be within the purview and scope of the invention and appended claims.

We claim:
1. In the hot extrusion method for metals having a melting point of at least about 2300° F., wherein an extrusion lubricant is employed between a hot metal billet to be extruded and the extrusion tools, including the container walls and the die, the improvement wherein a material comprising fibrous mineral wool having a fiber diameter of about 1 to about 20 microns and a bulk density of about 2 to about 12 pounds per cubic foot is used as said extrusion lubricant, said mineral wool consisting essentially of up to about 15% alumina, up to about 2% titania, up to about 2% of an alkali metal oxide, up to about 10% iron oxide, about 35% to about 45% silica, about 30% to about 40% lime, and about 5% to about 10% magnesia, with the acid and basic constituents being present in about equal molar amounts.

2. The method according to claim 1 wherein said lubricant comprises mineral wool pad with up to about 60% by weight of an additive material from the group consisting of alkali metal and alkaline earth metal halides, alkali metal and alkaline earth metal carbonates, glass fiber and glass particles and is placed between the end of the billet and the container wall which includes the die.

3. The method according to claim 2 wherein said additive material is applied as a coating upon said mineral wool.

References Cited

UNITED STATES PATENTS

| | | | |
|---|---|---|---|
| 2,538,917 | 1/1951 | Sejournet et al. | 65—24 |
| 2,706,850 | 4/1955 | Sejournet et al. | 65—24 |
| 3,059,769 | 10/1962 | Frost | 252—12 |

DANIEL E. WYMAN, Primary Examiner

I. VAUGHN, Assistant Examiner

U.S. Cl. X.R.

252—13, 25